UNITED STATES PATENT OFFICE.

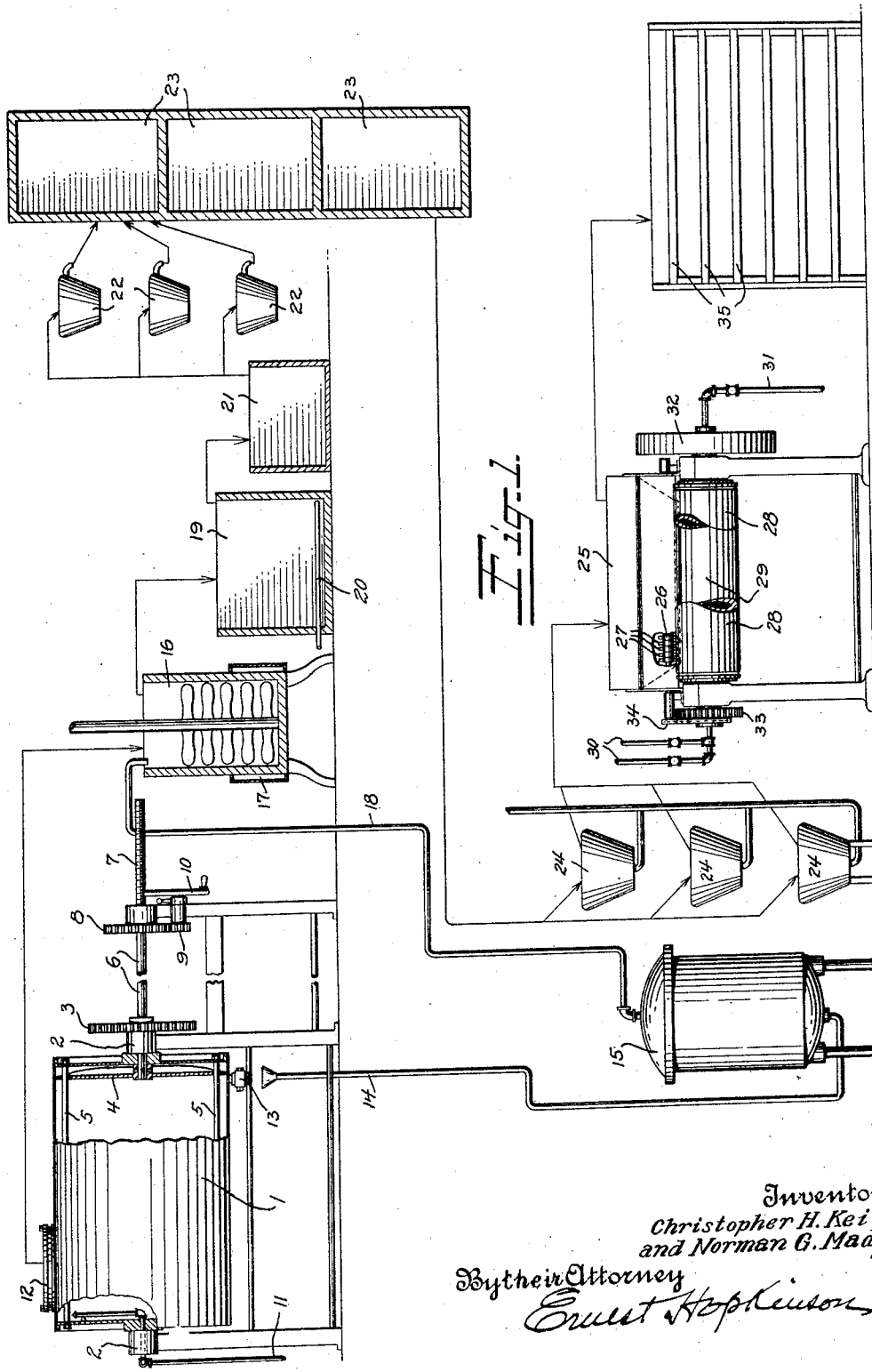

CHRISTOPHER H. KEITH AND NORMAN G. MADGE, OF PROVIDENCE, RHODE ISLAND, ASSIGNORS TO REVERE RUBBER COMPANY, A CORPORATION OF RHODE ISLAND.

METHOD OF DERESINATING AND PURIFYING BALATA.

1,406,654.  Specification of Letters Patent.  Patented Feb. 14, 1922.

Application filed November 14, 1921. Serial No. 514,945.

*To all whom it may concern:*

Be it known that we, CHRISTOPHER H. KEITH and NORMAN G. MADGE, both citizens of the United States, and both residents of Providence, county of Providence, and State of Rhode Island, have invented certain new and useful Improvements in Methods of Deresinating and Purifying Balata, of which the following is a full, clear, and exact description.

This invention relates to a method of deresinating and purifying balata and like substances.

In recent years the substance known as balata has come into extensive use for certain purposes, among the more important of which are its use as a cover material for golf balls, and for impregnating fabric belts. The crude balata, as received, contains a considerable proportion of resin which in some cases is very large, and it is also contaminated by the admixture of earthy substances, fragments of bark, etc., which render it unsuitable for use until after purification. A number of processes have been devised for purifying substances, such as balata and gutta percha, one of the most common of which is to wash the material in a mill in a manner similar to that employed in washing rubber, which removes mechanical impurities to a certain extent, and then to treat the material with a solvent capable of dissolving the resin. However, none of the processes so far devised reduce the resin, moisture and other impurities to the extent desired, and with the desired cheapness and speed.

The object of my invention is to provide an improved method for economically and efficiently deresinating and purifying balata and like substances.

For a detailed disclosure of the invention reference is had to the accompanying specification and drawing, in which latter:

Fig. 1 shows in more or less diagrammatic form an assemblage of apparatus for carrying out my invention.

Referring to the drawing, the numeral 1 designates a barrel churn for extracting resin, which is journaled in a suitable framework at 2 and rotated by means of the gear 3 driven in any suitable manner. Mounted within the churn is a ram 4 through which pass the longitudinal fixed rods 5 for preventing rotation of the ram. The spindle or shaft 6 of the ram extends through the bearing of the churn and is screw-threaded at its outer end as shown at 7. A gear 8 secured against longitudinal movement, is mounted in threaded relation on the spindle 6 and is driven by the pinion 9 mounted on the shaft of a hand wheel 10. A supply pipe 11 for the solvent used, which in the present instance is gasoline, passes through the other bearing of the churn and communicates with the interior thereof. A man-hole 12 is provided for introducing and withdrawing the material to be operated on, and the valved outlet 13 is provided for withdrawing the solvent after it has extracted the resin. The resin laden solvent may be conducted by a pipe 14 to a still 15, and the purified solvent distilled off therein. The material is then withdrawn from the churn 1 and is placed in the churn 16, which latter may be heated by a steam jacket 17, and supplied with purified solvent from the still by the pipe 18. The balata, after it has become dissolved in the solvent under the action of the heat, is then conducted to the storage reservoir 19 where it may be kept in a heated condition by means of the steam coil 20. In the present embodiment the dissolved balata is then conducted into a small working reservoir 21 from which it is supplied in regulated quantity to the centrifugals 22, and from the centrifugals the solution passes to the cooling tanks 23 where the balata is redeposited from the solution. It is then placed in the centrifugal driers 24, which remove a considerable part of the entrapped gasoline, and the balata then is placed in the hopper 25, which is provided near the outlet in its bottom with a roll 26 having the projecting fingers 27 for the purpose of breaking up or crumbling the balata. The crumbled balata issuing from the hopper falls between a pair of squeezing rolls 28 and 29, which act to further remove entrapped gasoline and to compact the balata. The rolls 28 and 29, which are hollow, may be heated by means of steam supplied through the pipes 30 and exhausted through the pipes 31. The roll 28 has a pulley wheel 32 mounted on its shaft at one end by which it is driven, and at the other end of its shaft is provided with a gear 33 for driving the roll 29. A sprocket and chain connection 34 also drives the roll 26 from roll 28. From the squeezing rolls the balata then passes to the drying trays 35, where it is allowed to dry for a period of about eight hours.

In the operation of the apparatus shown, the balata, which has been previously finely divided, is introduced in the churn 1 through the man-hole 12, and the solvent, which in the present instance is gasoline, is supplied through the pipe 11. The churn is then operated by means of the gear 3 until the gasoline, which has the property of dissolving the resin from the balata in the cold, has removed the resin from the balata. The ram 4 is then operated by means of the hand wheel 10 to squeeze the resin-laden solvent from the balata, which solvent, as before stated, may then be emptied through the outlet 13. In case the resin is not completely removed by the first operation, the churning may be repeated. The deresinated balata is then placed in the churn 16 and under the action of the heated gasoline, is dissolved therein and drawn off into the storage reservoir 19, and thence into the working reservoir 21 and the centrifugals 22. The centrifugals remove any mechanical impurities in the solution, which then passes into the cooling tanks 23 practically free from all resin and impurities. By means of the centrifugal driers 24 and the crumbler and squeezing rolls, any gasoline entrapped in the balata is largely removed, and after drying in thin layers on the trays 35 a balata is obtained which has only about ½ per cent moisture and ¾ per cent resin.

It is not necessary that the specific apparatus above disclosed be used in carrying out the process, and it is not limited in its use to the purifying of balata. It is obvious that other solvents may be used provided the material be first treated with one capable of dissolving the resin and then with one in which the material itself is soluble.

Having thus described our invention, what we claim and desire to protect by Letters Patent is:

1. The process of purifying balata or like material which consists in treating the balata with a solvent in which its resinous content is soluble, separating out and dissolving the balata residue, mechanically removing impurities therefrom, depositing the balata from the solution and drying and compacting it.

2. The process of purifying balata or like material which consists in agitating the finely divided balata with a solvent in which its resinous content is soluble, removing by pressure the dissolved resin and solvent, dissolving the balata residue in a solvent, mechanically removing impurities therefrom, depositing the balata from the solution, partially drying it, breaking up and compacting it and finally drying.

3. The process of purifying balata or like material which consists in agitating the finely divided balata with a solvent, in which its resinous content is soluble in the cold, expressing the dissolved resin and solvent from the balata, dissolving the balata residue in a heated solvent, mechanically removing impurities from the solution, depositing the balata from the solution, partially drying it, breaking up and compacting it and finally drying.

4. The process of purifying balata or like material which consists in agitating the finely divided balata with a solvent in which only its resinous content is soluble in the cold, expressing the dissolved resin and solvent from the balata, dissolving the balata residue in a heated portion of the solvent, removing impurities therefrom by a centrifugal action, redepositing the balata from the solution by cooling, partially drying it by centrifugal action, breaking up and compacting it and finally drying in thin layers.

5. The process of purifying balata or like material which consists in agitating the finely divided balata with a solvent in which only its resinous content is soluble in the cold, expressing the dissolved resin and solvent from the balata, heating and agitating the balata residue with a solvent in which it is soluble under the influence of heat, mechanically removing impurities from the balata solution, redepositing the balata by cooling, partially drying it, breaking up and squeezing it to remove entrapped solvent, and finally drying.

Signed at Providence, in the county of Providence, and State of Rhode Island, this 3rd day of Nov., 1921.

CHRISTOPHER H. KEITH.

Signed at New York, in the county of New York, and State of New York, this 9th day of Nov., 1921.

NORMAN G. MADGE.